US010372351B2

(12) United States Patent
Frid et al.

(10) Patent No.: US 10,372,351 B2
(45) Date of Patent: Aug. 6, 2019

(54) TECHNIQUES FOR NON-BLOCKING CONTROL INFORMATION AND DATA SYNCHRONIZATION BY A DATA STORAGE DEVICE

(71) Applicant: WESTERN DIGITAL TECHNOLOGIES, INC., Irvine, CA (US)

(72) Inventors: Marina Frid, Jerusalem (IL); Igor Genshaft, Bat Yam (IL)

(73) Assignee: Western Digital Technologies, Inc., San Jose, CA (US)

( * ) Notice: Subject to any disclaimer, the term of this patent is extended or adjusted under 35 U.S.C. 154(b) by 67 days.

(21) Appl. No.: 15/440,394

(22) Filed: Feb. 23, 2017

(65) Prior Publication Data

US 2018/0239545 A1 Aug. 23, 2018

(51) Int. Cl.
| | |
|---|---|
| *G06F 11/14* | (2006.01) |
| *G06F 12/08* | (2016.01) |
| *G06F 12/0808* | (2016.01) |
| *G06F 12/0815* | (2016.01) |
| *G06F 3/06* | (2006.01) |
| *G06F 12/10* | (2016.01) |

(52) U.S. Cl.
CPC .......... *G06F 3/0619* (2013.01); *G06F 3/0613* (2013.01); *G06F 3/0656* (2013.01); *G06F 3/0679* (2013.01); *G06F 12/10* (2013.01); *G06F 2212/65* (2013.01)

(58) Field of Classification Search
CPC ..................................................... G06F 3/0619
USPC ....................................................... 711/103
See application file for complete search history.

(56) References Cited

U.S. PATENT DOCUMENTS

| | | | | |
|---|---|---|---|---|
| 5,255,270 | A | * | 10/1993 | Yanai .................. G06F 11/1435 360/53 |
| 6,526,477 | B1 | | 2/2003 | Yuan et al. |
| 7,366,826 | B2 | | 4/2008 | Gorobets et al. |
| 7,386,655 | B2 | | 6/2008 | Gorobets et al. |
| 7,865,658 | B2 | | 1/2011 | Lasser et al. |
| 8,006,047 | B2 | * | 8/2011 | De Souza ............. G06F 3/0611 711/156 |
| 8,473,963 | B2 | | 6/2013 | Kottapalli et al. |

(Continued)

OTHER PUBLICATIONS

Hahn, et al., "Data Relocation," U.S. Appl. No. 15/229,252, filed Aug. 5, 2016, 59 pages.

(Continued)

*Primary Examiner* — Mohamed M Gebril
(74) *Attorney, Agent, or Firm* — Michael Best & Friedrich LLP (57) ABSTRACT

An apparatus includes a non-volatile memory and a controller coupled to the non-volatile memory. The controller includes an interface configured to send control information to a host device. The control information is associated with first parity information. The controller further includes a circuit configured to determine second parity information associated with the control information. The controller is configured to terminate and optionally rollback an operation associated with the control information in response to the first parity information differing from the second parity information. The terminated optionally rolled-back operation associated with the control information may be a non-blocking control sync operation.

18 Claims, 3 Drawing Sheets

(56) References Cited

U.S. PATENT DOCUMENTS

| | | | |
|---|---|---|---|
| 8,904,118 B2 | 12/2014 | Mamidala et al. | |
| 8,966,176 B2 | 2/2015 | Duzly et al. | |
| 9,047,178 B2 | 6/2015 | Talagala et al. | |
| 9,146,824 B1* | 9/2015 | Chen | G06F 11/2268 |
| 9,317,366 B2* | 4/2016 | Wang | G06F 12/00 |
| 9,817,593 B1* | 11/2017 | Inbar | G06F 3/0619 |
| 9,927,984 B2* | 3/2018 | Qiu | G06F 3/0619 |
| 9,959,044 B2* | 5/2018 | Liu | G06F 3/0605 |
| 2008/0168252 A1* | 7/2008 | Kunimune | G06F 12/0246 |
| | | | 711/173 |
| 2011/0099325 A1* | 4/2011 | Roh | G06F 3/0619 |
| | | | 711/103 |
| 2011/0161557 A1* | 6/2011 | Haines | G06F 12/0893 |
| | | | 711/103 |
| 2011/0191652 A1* | 8/2011 | Dave | G06F 11/10 |
| | | | 714/758 |
| 2011/0296088 A1* | 12/2011 | Duzly | G06F 12/0246 |
| | | | 711/103 |
| 2011/0302446 A1* | 12/2011 | Becker-Szendy | G06F 11/1076 |
| | | | 714/6.1 |
| 2012/0084490 A1* | 4/2012 | Choi | G11C 16/02 |
| | | | 711/103 |
| 2012/0317377 A1* | 12/2012 | Palay | G06F 12/0246 |
| | | | 711/154 |
| 2014/0059270 A1* | 2/2014 | Zaltsman | G06F 3/061 |
| | | | 711/103 |
| 2015/0169228 A1* | 6/2015 | Sivasankaran | G06F 3/0625 |
| | | | 711/103 |
| 2015/0381206 A1* | 12/2015 | Fainzilber | H03M 13/1108 |
| | | | 714/758 |
| 2016/0004634 A1* | 1/2016 | Kim | G06F 12/0246 |
| | | | 711/103 |
| 2016/0055084 A1 | 2/2016 | Rangaswami et al. | |
| 2016/0110249 A1* | 4/2016 | Orme | G06F 12/0238 |
| | | | 714/6.24 |
| 2016/0124640 A1* | 5/2016 | Park | G06F 12/0802 |
| | | | 711/103 |
| 2016/0188212 A1* | 6/2016 | Camp | G06F 3/064 |
| | | | 711/171 |
| 2016/0188223 A1* | 6/2016 | Camp | G06F 3/0613 |
| | | | 711/103 |
| 2016/0188231 A1* | 6/2016 | Mittelholzer | G06F 3/0619 |
| | | | 714/704 |
| 2017/0262034 A1* | 9/2017 | Isaac | G06F 1/266 |
| 2018/0004428 A1* | 1/2018 | Seong | G06F 12/128 |
| 2018/0039541 A1* | 2/2018 | Hahn | G06F 11/1076 |

OTHER PUBLICATIONS

Inbar, et al., "Block Management in Non-Volatile Memory System With Non-Blocking Control Sync System," U.S. Appl. No. 15/207,212, filed Jul. 11, 2016, 77 pages.

* cited by examiner

TECHNIQUES FOR NON-BLOCKING CONTROL INFORMATION AND DATA SYNCHRONIZATION BY A DATA STORAGE DEVICE

FIELD OF THE DISCLOSURE

This disclosure is generally related to electronic devices and more particularly to data storage devices.

BACKGROUND

Data storage devices enable users to store and retrieve data. Examples of data storage devices include volatile memory devices and non-volatile memory devices. A non-volatile memory may retain data after a power-down event, and a volatile memory may lose data after a power-down event. An example of a non-volatile memory is a flash memory.

A data storage device may store control information associated with data. For example, a data storage device may maintain a management table that indicates a mapping of logical addresses to physical addresses.

In some implementations, a management table is maintained in a volatile memory of a controller of a data storage device. The data storage device may update the management table at the volatile memory and may periodically send the management table to a non-volatile memory of the data storage device (e.g., to "back up" the management table).

Updating and backing up a management table uses resources of a data storage device. For example, certain flash storage devices may "block" operations to update a management table while the management table is being stored to the non-volatile memory, reducing throughput. If certain operations to the non-volatile memory are not "blocked" while the management table is stored to the non-volatile memory, a "race" condition may result, such as a race condition between storing of the management table and updating of the management table. In some circumstances, such a race condition may result in inconsistent data due to modification of the data during a write operation. Such an inconsistency may reduce performance of a data storage device, such as by resulting in "lost" data.

DETAILED DESCRIPTION

A data storage device may use multiple copies of control information (e.g., a management table) to enable a non-blocking control sync (NBCS) operation. For example, the data storage device may store a copy of the control information (or a portion of the control information) at a volatile memory of the data storage device and another copy of the control information (or another portion of the control information) at another memory, such as a memory of a host device. As used herein, an NBCS operation may refer to an operation that includes storing control information to a non-volatile memory while also allowing updating of the control information during the storing of the control information.

To illustrate, an NBCS operation may include copying the control information from the memory of the host device to the non-volatile memory of the data storage device. During the NBCS operation, the data storage device may perform one or more updates of the control information stored at the volatile memory, such an update in response to a write operation that is performed to the non-volatile memory substantially concurrently with (e.g., in parallel with) copying the control information from the memory of the host device to the non-volatile memory. Copying and updating different copies (or different portions) of the control information may avoid a "race" condition that causes uncertainty regarding whether the control information is copied prior to or after updating the control information.

In some circumstances, the memory of the host device may be "unreliable" from the perspective of the data storage device. An example of an "unreliable" memory is a host memory buffer (HMB) of the host device. For example, in some implementations, the copy (or portion) of the control information stored at the memory of the host device may be subject to modification by the host device without notification to the data storage device. To compensate for "unreliability" of the memory of the host device, the data storage device may verify accuracy of the control information stored at the memory of the host device prior to copying the control information from the memory of the host device to non-volatile memory. For example, the data storage device may be configured to use parity information (e.g., a result of an exclusive-or (XOR) operation) to determine whether the host device has modified the control information. If the data storage device determines based on the parity information that the host device has modified the control information, the data storage device may "roll back" (or restart) an operation, such as an NBCS operation to copy the control information to the non-volatile memory. Other particular aspects of the disclosure are described below with reference to the drawings.

In the description, common or similar features may be designated by common reference numbers. As used herein, "exemplary" may indicate an example, an implementation, and/or an aspect, and should not be construed as limiting or as indicating a preference or a preferred implementation.

Figure 1:
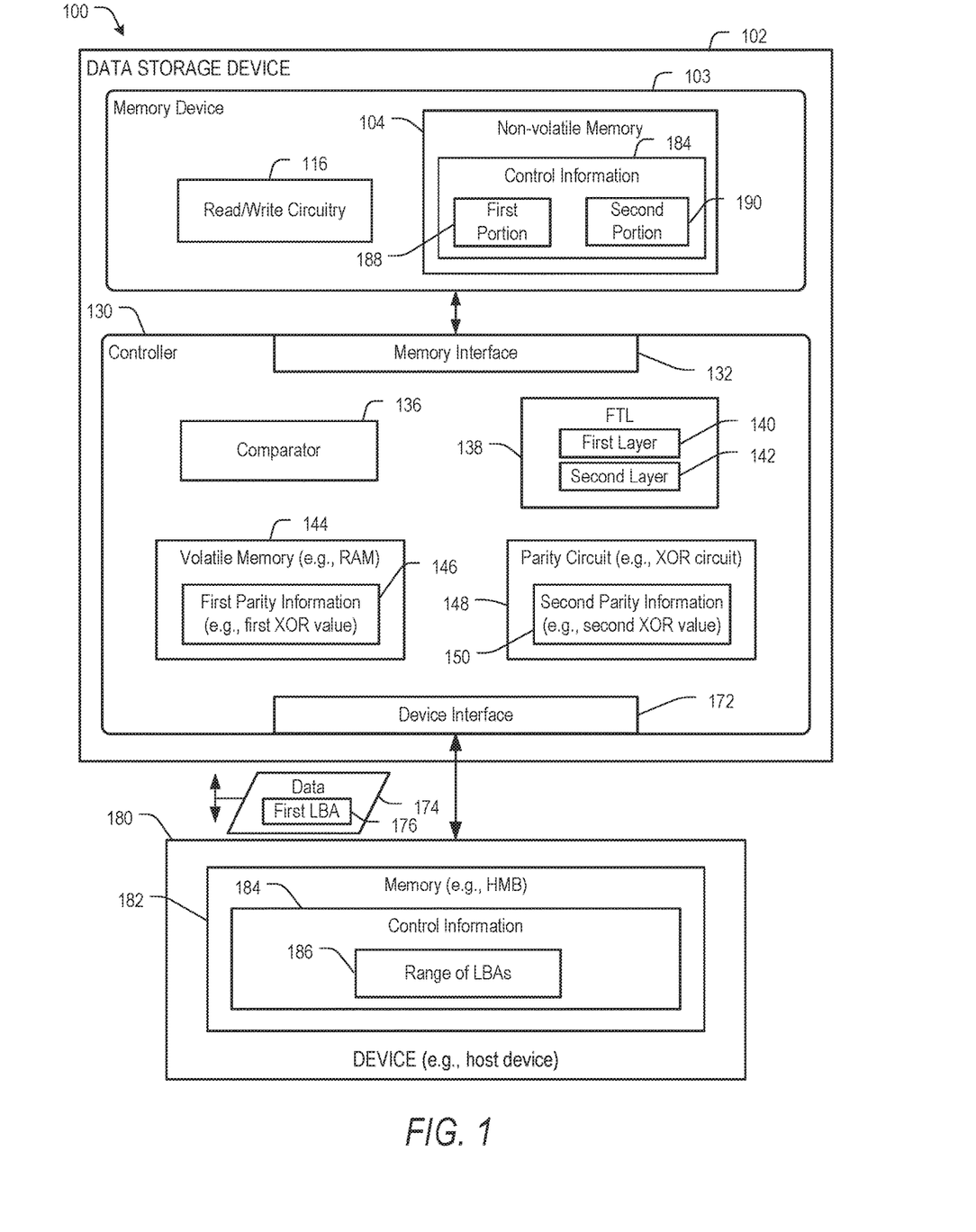
FIG. 1 is a diagram of a particular illustrative example of a system including a data storage device.

Referring to FIG. 1, a particular illustrative example of system is depicted and generally designated 100. The system 100 includes a data storage device 102 and a device 180 (e.g., a host device or an access device). The data storage device 102 includes a memory device 103 (e.g., one or more memory dies) and a controller 130. The controller 130 is coupled to the memory device 103.

The memory device 103 includes read/write circuitry 116 and a non-volatile memory 104, such as a non-volatile array of storage elements included in one or more memory dies. The non-volatile memory 104 may include a flash memory (e.g., a NAND flash memory) or a resistive memory, such as a resistive random access memory (ReRAM), as illustrative examples. The non-volatile memory 104 may have a three-dimensional (3D) memory configuration. As used herein, a 3D memory device may include multiple physical levels of storage elements (instead of having a single physical level of storage elements, as in a planar memory device). As an example, the non-volatile memory 104 may have a 3D vertical bit line (VBL) configuration. In a particular implementation, the non-volatile memory 104 is a non-volatile memory having a 3D memory array configuration that is monolithically formed in one or more physical levels of arrays of memory cells having an active area disposed above a silicon substrate. Alternatively, the non-volatile memory 104 may have another configuration, such as a two-dimensional (2D) memory configuration or a non-monolithic 3D memory configuration (e.g., a stacked die 3D memory configuration).

The non-volatile memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the non-volatile memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The controller 130 includes a memory interface 132 to the memory device 103 and further includes a device interface 172 (e.g., a host interface) to the device 180. The controller 130 may further include a comparator 136, a flash translation layer (FTL) 138, a volatile memory 144, and a parity circuit 148. The volatile memory 144 may include a random access memory (RAM), as an illustrative example.

The device 180 includes a memory 182. The controller 130 may be configured to access the memory 182, such as by writing data to the memory 182 and by reading data from the memory 182. The device interface 172 is configured to send data to the device 180 and to receive data from the device 180.

The memory 182 may be "unreliable" from the perspective of the data storage device 102. As used herein, a memory (e.g., the memory 182) may be "unreliable" if data at the memory is subject to writing or modification by multiple devices. For example, the memory 182 is writable by the data storage device 102 and by the device 180. In some circumstances, the device 180 may modify (e.g., change or overwrite) data written to the memory 182 by the data storage device 102 without notifying the data storage device 102. As a result, the memory 182 may appear to be "unreliable" to the data storage device 102.

During operation, the controller 130 may receive data 174 from the device 180, such as in connection with a request for write access to the non-volatile memory 104. The controller 130 is configured to send the data 174 (or an encoded representation of the data 174) to the memory device 103. The memory device 103 may store the data 174 to a particular region of the non-volatile memory 104 (e.g., by writing the data 174 to the non-volatile memory 104 using the read/write circuitry 116).

In some cases, the volatile memory 144 may store a mapping table, and the controller 130 may update the mapping table in response to storing the data 174 to the non-volatile memory 104. The controller 130 may store the mapping table to the non-volatile memory 104 (e.g., to enable retrieval of the mapping table after a power cycle at the data storage device 102).

The controller 130 may be configured to operate the memory 182 as a virtual extension of the volatile memory 144. For example, the controller 130 may be configured to store control information 184 (e.g., a mapping table) at the memory 182, such as after a storage capacity of the volatile memory 144 is satisfied. In some circumstances, data stored at the memory 182 may be unreliable. For example, in some cases, the device 180 may modify the control information 184.

To increase reliability of data stored at the memory 182, the data storage device 102 may operate in accordance with a first example. In the first example, the controller 130 is configured to generate first parity information 146. For example, the controller 130 may be configured to generate the first parity information 146 by inputting data (e.g., the control information 184) to the parity circuit 148. In a particular illustrative example, the parity circuit 148 includes an XOR circuit configured to perform an XOR operation to generate the first parity information 146 (e.g., a first XOR value or a first set of XOR values). Alternatively or in addition, the parity circuit 148 may include one or more other devices.

The controller 130 may be configured to generate the first parity information 146 prior to sending the data to the memory 182 (e.g., prior to sending the control information 184 to the memory 182) and to store the first parity information 146 at the controller 130. For example, the volatile memory 144 may be configured to store the first parity information 146. After generating the first parity information 146, the controller 130 may send the control information 184 to the device 180 to be stored at the memory 182.

The data storage device 102 may initiate an operation associated with data stored at the memory 182. For example, the data storage device 102 may an initiate an operation to access the control information 184, such as a non-blocking control sync (NBCS) operation to synchronize a first version of the control information 184 stored at the memory 182 with a second version of the control information 184 stored at the non-volatile memory 104. As another example, the operation may include a relocation operation to copy data from the memory 182 to the non-volatile memory 104. Alternatively or in addition, the data storage device 102 may initiate another operation. The operation may be a "reversible" operation that can be "rolled back" or re-started.

In response to initiating an operation associated with data stored at the memory 182, the controller 130 may generate second parity information 150 associated with the data. For example, in response to initiating an NBCS operation associated with the control information 184, the controller 130 may access the control information 184 and may generate the second parity information 150 based on the control information 184. To illustrate, the controller 130 may input the control information 184 to the parity circuit 148, and the parity circuit 148 may be configured to generate the second parity information 150 based on the control information 184. In a particular illustrative example, the parity circuit 148 includes an XOR circuit configured to perform an XOR operation to generate the second parity information 150 (e.g., a second XOR value or a second set of XOR values). Alternatively or in addition, the parity circuit 148 may include one or more other devices.

In some circumstances, the first parity information 146 may differ from the second parity information 150. For example, the first parity information 146 may be determined by the controller 130 at a first time, and the second parity information 150 may be determined by the controller 130 at a second time after the first time. If the device 180 modifies the control information 184 between the first time and the second time, the first parity information 146 may differ from the second parity information 150 (due to modification of the control information 184 by the host device between the first time and the second time).

The controller 130 may be configured to compare the first parity information 146 and the second parity information 150. For example, the comparator 136 may be configured to compare the first parity information 146 and the second parity information 150 to determine whether the first parity information 146 differs from the second parity information 150.

If the first parity information 146 corresponds to (e.g., is equal to) the second parity information 150, the data storage device 102 may continue operation. To illustrate, depending on the particular example, the data storage device 102 may continue performing the NBCS operation, the operation to relocate data, or another operation.

If the first parity information 146 does not correspond to (e.g., is not equal to) the second parity information 150, the controller 130 is configured to terminate the operation. To illustrate, terminating the operation may include restarting the operation, rolling back the operation, declining to commit the operation, or invaliding data stored to the non-volatile memory 104 in connection with the operation.

In some examples, after terminating the operation, the data storage device 102 may restart the operation. As a non-limiting illustrative example, the data storage device 102 may request the device 180 to restore data stored at the memory 182 or to provide an indication of modifications made to data stored at the memory 182. As another illustrative non-limiting example, the data storage device 102 may error-correct the data using redundancy information included in the data based on a particular error correcting code (ECC) used to encode the data. The data storage device 102 may retry the operation (e.g., after data is restored at the memory 182, such as by "rolling back" changes made to the data stored at the memory 182 or error-correcting the data).

Alternatively or in addition to the first example, the data storage device 102 may operate in accordance with a second example. The data storage device 102 may operate according to the second example to perform an NBCS operation without "blocking" access to the non-volatile memory 104. As used herein, an "NBCS" operation may refer to a control sync operation that is performed while allowing access to the non-volatile memory 104, to the volatile memory 144, or both.

To illustrate, in the second example, the controller 130 may retrieve the control information 184 from the memory 182 in connection with an NBCS operation to copy the control information 184 to the non-volatile memory 104. For example, the NBCS operation may be performed to synchronize a first version of the control information 184 stored at the memory 182 with a second version of the control information 184 stored at the non-volatile memory 104.

During the NBCS operation, the data storage device 102 may initiate a second operation at the non-volatile memory 104. For example, the data storage device 102 may receive a request for write access to the non-volatile memory 104 from the device 180. As another example, the data storage device 102 may initiate a maintenance operation at the non-volatile memory 104, such as a compaction process (or "garbage collection"), as an illustrative example.

In some circumstances, performing the second operation during the NBCS operation may render the control information 184 inaccurate. For example, upon performing the second operation, the data storage device 102 may update the control information 184 at the non-volatile memory 104 to reflect the second operation. In some circumstances, the updates may be overwritten by the NBCS operation. As a result, certain devices may suspend (or "block") operations during an NBCS operation (e.g., to avoid overwriting updates).

In accordance with the second example, the data storage device 102 may selectively modify the control information 184 at the non-volatile memory 104 during an NBCS operation based on aspects of the FTL 138. To illustrate, the data storage device 102 may retrieve the control information 184 from the memory 182 in connection with an NBCS operation to copy the control information 184 to the non-volatile memory 104.

During the NBCS operation, the data storage device 102 may initiate a second operation (e.g., a write operation) to store data to the non-volatile memory 104. For example, the data storage device 102 may receive a request for write access to the non-volatile memory 104 from the device 180 to write the data 174 to the non-volatile memory 104. The data 174 may be associated with one or more logical block addresses (LBAs), such as a first LBA 176. As another example, the data storage device 102 may initiate a maintenance operation associated with the data 174 at the non-volatile memory 104.

In a particular example, the controller 130 is configured to update a copy of the control information 184 stored at the volatile memory 144 based on the second operation concurrently or substantially concurrently (e.g., in parallel) with copying of the control information 184 from the memory 182 to the non-volatile memory 104. After updating the copy of the control information 184 at the volatile memory 144, the controller 130 may update one or more other copies of the control information 184 based on the update performed at the volatile memory 144, such as by propagating the update to copies of the control information 184 stored at the memory 182, at the non-volatile memory 104, or both.

In another example, the controller 130 may be configured to concurrently copy the control information 184 from the memory 182 to the non-volatile memory 104 and to update the copy of the control information 184 at the non-volatile memory 104. To illustrate, the controller 130 may be configured to determine whether updating the control information 184 at the non-volatile memory 104 in response to the second operation is likely to cause a "collision" with the NBCS operation. For example, if updating of portions (e.g., entries) of the control information 184 indicating the first LBA 176 has been completed at the non-volatile memory 104 by the NBCS operation, then no collision is likely. As another example, if updating of portions (e.g., entries) of the control information 184 indicating the first LBA 176 has not yet been initiated at the non-volatile memory 104 by the NBCS operation, then no collision is likely.

Alternatively, if the first LBA 176 is within a range of LBAs 186 currently being updated at the non-volatile memory 104, then the second operation may be likely to "collide" with the NBCS operation (e.g., by potentially overwriting an update to the control information 184 at the non-volatile memory 104). For example, the data storage device 102 may be configured to update the control information 184 at the non-volatile memory 104 in "bursts" (e.g., a particular number of portions of the control information 184).

In response to determining that the first LBA 176 is included in the range of LBAs 186 associated with the first operation (e.g., a burst of the first operation), the data storage device 102 may selectively update a first portion 188 of the control information at the non-volatile memory 104. The first portion 188 may be associated with a first layer 140 specified by the FTL 138. The first portion 188 may be updated independently of (e.g., without modification to) a second portion 190 that is associated with a second layer 142 specified by the FTL 138. In a particular example, the FTL 138 is a multi-layer FTL (e.g., a dual-layer FTL) having multiple control information layers, such as a first control information layer (e.g., the first layer 140) and a second control information layer (e.g., the second layer 142).

The data storage device 102 is configured to perform NBCS operations to the non-volatile memory 104. An NBCS operation may include writing the control information 184 without blocking other memory access operations to the non-volatile memory 104. To further illustrate, the data storage device 102 may be configured to perform a first operation to store the control information 184 to the non-volatile memory 104 and to perform a second operation to store mapping information (e.g., the control information 184, a particular version of the control information 184, or other information) to the controller 130 during the first operation. For example, the second operation may include copying the control information 184 from the memory 182 to the volatile memory 144 or from the non-volatile memory 104 to the volatile memory 144. The first operation and the second operation may correspond to non-blocking operations enabled by the first layer 140 and the second layer 142. For example, the first layer 140 and the second layer 142 may be split into regions, and the first operation to store the control information 184 to the non-volatile memory 104 may be associated with regions from both the first layer 140 and the second layer 142. The controller 130 may be configured to selectively update the first layer 140 or the second layer 142 in regions that are not included in the first operation to store the control information 184 to the non-volatile memory 104. Illustrative examples of regions associated with the FTL 138 are described further with reference to FIG. 2.

The first operation may be performed in a non-blocking manner. To illustrate, the first operation may correspond to the terminated operation described above with reference to the first example. As described above with reference to the first example, an operation to store the control information 184 to the non-volatile memory 104 may be terminated in response to determining that the first parity information 146 differs from the second parity information 150. In some implementations, the first operation may optionally be "rolled back" and restarted. In this case, the controller 130 is configured to perform a rollback operation in response to termination of the first operation to store the control information 184 to the non-volatile memory 104.

Performing an NBCS operation may include updating of the control information 184 during the NBCS operation. For example, the controller 130 may update the control information 184 based on data that is written to the non-volatile memory 104 concurrently with the control information 184. In this case, the control information 184 may be updated based on data that is written to the non-volatile memory 104 concurrently with the control information 184. To enable an NBCS operation, the data storage device 102 may use the memory 182. For example, the data storage device 102 may "virtualize" the volatile memory 144 using the memory 182 (e.g., so that the control information 184 may be updated at the memory 182 while the control information 184 is accessed at the volatile memory 144 to be written to the non-volatile memory 104).

One or more aspects described with reference to FIG. 1 may improve performance of the data storage device 102. For example, by performing an NBCS operation, throughput at the data storage device 102 may be improved as compared to a device that "blocks" memory access operations. Further, use of the memory 182 may enable NBCS operations. For example, to enable an NBCS operation, the data storage device 102 may "virtualize" the volatile memory 144 using the memory 182 (e.g., so that the control information 184 may be updated at the memory 182 while the control information 184 is accessed at the volatile memory 144 to be written to the non-volatile memory 104). Further, by "virtualizing" the volatile memory 144 using the memory 182, memory available to store the control information 184 may be increased to enable concurrent storing and updating of the control information 184. Use of the memory 182 may therefore improve performance as compared to a device that separately performs synchronization operations, table update operations, and other memory access operations.

Figure 2:
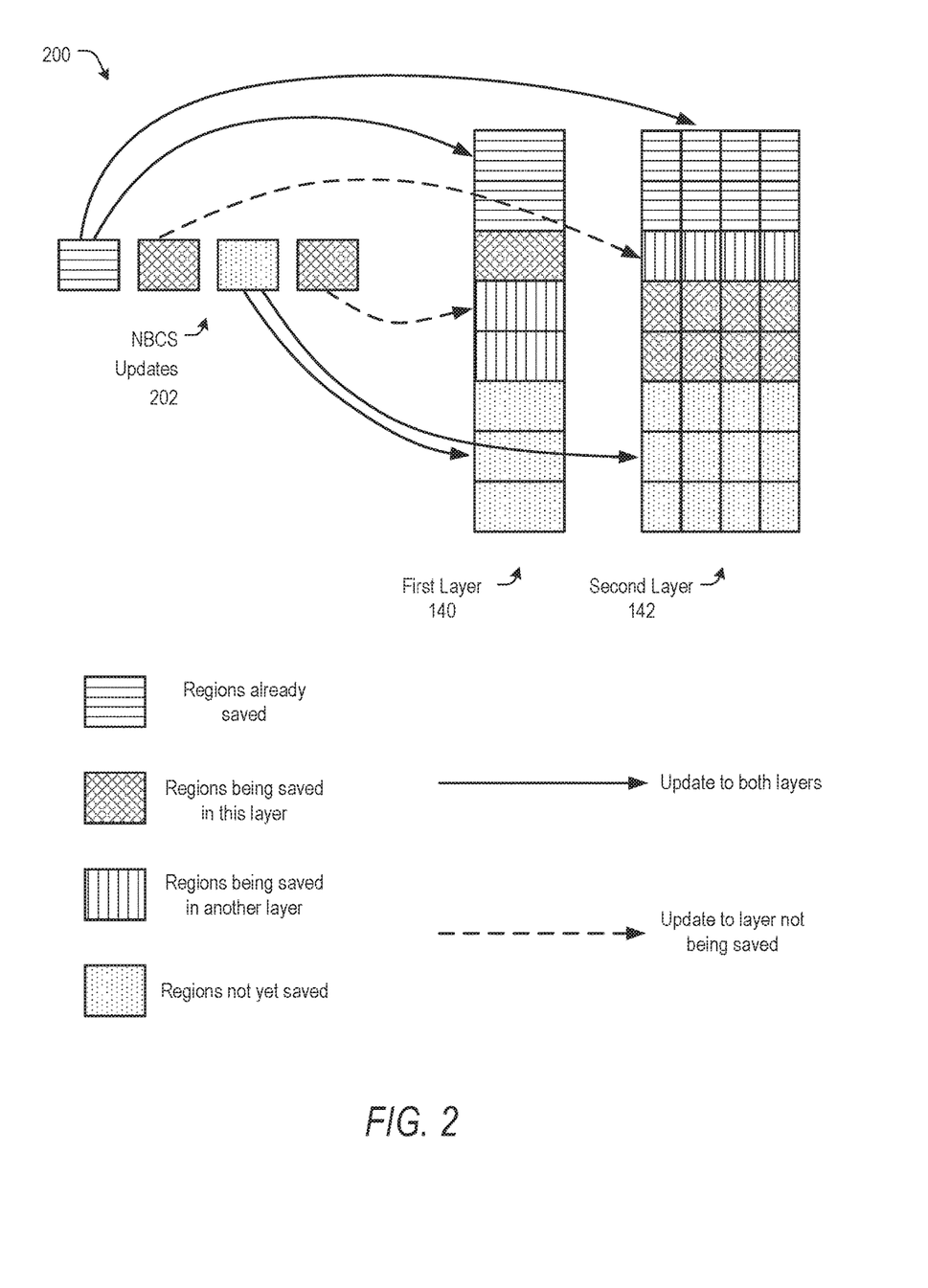
FIG. 2 depicts aspects of an illustrative example of a control data update process that may be performed by the data storage device of FIG. 1 in connection with a non-blocking control sync (NBCS) operation.

FIG. 2 depicts aspects of a particular illustrative example of a control data update process 200. The control data update process 200 includes non-blocking control sync (NBCS) updates 202 targeting regions of the first layer 140 and the second layer 142. The control data update process 200 may be performed to update (e.g., synchronize) the control information 184 at the non-volatile memory 104 using an NBCS operation, such as described with reference to FIG. 1.

As used herein, a "region" may refer to a set of LBAs, where an LBA space of the layers 140, 142 may be split into a set of regions. Corresponding regions in both of the layers 140, 142 may be responsible for the same LBA ranges. During an NBCS operation, management tables of the first layer 140 or the second layer 142 may be stored for any subset of regions (e.g., but not for both of the layers 140, 142 for the same region).

In FIG. 2, regions already saved by an NBCS operation may be associated with updates to both of the layers 140, 142. FIG. 2 also depicts that regions not yet saved by an NBCS operation may be associated with updates to both of the layers 140, 142. If a region is currently being saved, an update may be performed to one of the layers 140, 142 (i.e., to whichever layer is not currently being saved) without updating the other of the layers 140, 142 (i.e., which layer is currently being saved).

To further illustrate aspects of the disclosure, a first process performed by the data storage device 102 may include allocating an "unreliable" memory (e.g., the memory 182). For example, allocating the unreliable memory may include requesting access to the memory 182. The first process may further include initializing the unreliable memory with zero values and initializing first parity information (e.g., the first parity information 146) to be equal to zero. The first process may further include performing one more "restartable" flash operations, such as a data relocation operation, an NBCS operation, one or more operations, or a combination thereof. If data stored at the unreliable memory is modified, the first parity information may be adjusted (e.g., by re-determining the first parity information based on the modified data). Prior to committing an operation, the first process may include determining second parity information based on data stored within the unreliable memory. The second parity information may be compared to the first parity information. If the first parity information corresponds to (e.g., is equal to) the second parity information, the first process may include committing the operation. If the first parity information differs from (e.g., is unequal to) the second parity information, the first process may include restarting the flash operation (e.g., by performing a rollback of the flash operation).

Alternatively or in addition to the first process, a second process performed by the data storage device 102 may include initiation synchronization of control data (e.g., the control information 184). The second process may include selecting a set of regions to be saved using a burst operation and sending the burst data to a flash device (e.g., the non-volatile memory 104). The second process may include handling host data and/or relocation data while waiting for the burst to be saved (e.g., by writing the data 174 to the non-volatile memory 104). If one or more LBAs associated with the data belong to the current burst, then an update may be performed to the layer not being saved (e.g., the first layer 140 without updating the second layer 142, or vice versa). In this case, for every region, only one of two layers may be saved during a burst. Alternatively, if the one or more LBAs do not belong to the current burst, both layers may be updated.

Figure 3:
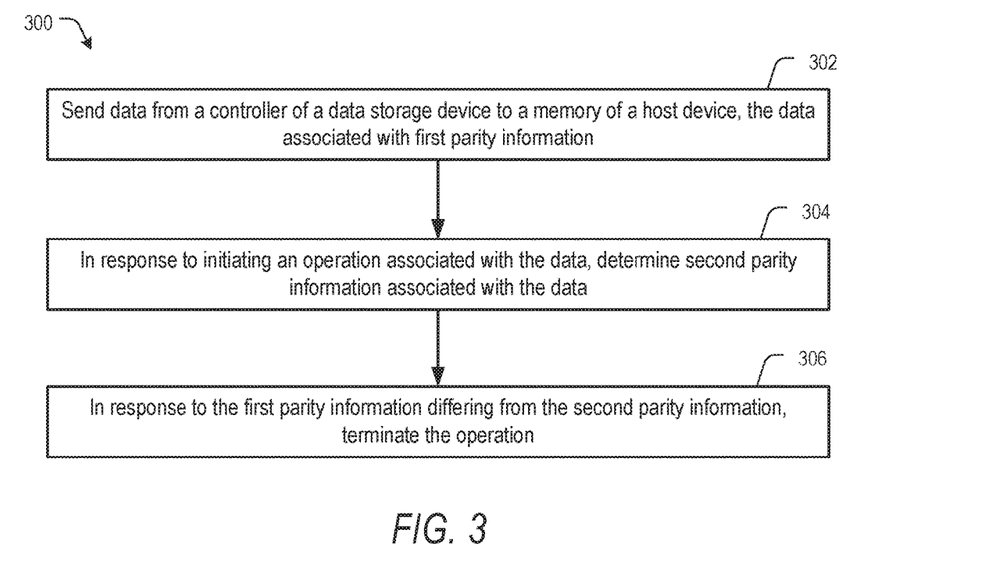
FIG. 3 is a flow chart of a particular illustrative example of a method of operation of the data storage device of FIG. 1.

Referring to FIG. 3, an illustrative example of a method of operation of a data storage device is depicted and generally designated 300. For example, the method 300 may be performed by the data storage device 102 of FIG. 1.

The method 300 includes sending data from a controller of the data storage device to a memory of a host device, at 302. The data is associated with first parity information. For example, the controller 130 may send the control information 184 to the memory 182 of the device 180, and the control information 184 may be associated with the first parity information 146.

The method 300 further includes determining second parity information associated with the data in response to initiating an operation associated with the data, at 304. For example, the controller 130 may determine the second parity information 150 in response to accessing the control information 184 at the memory 182.

The method 300 further includes terminating the operation in response to the first parity information differing from the second parity information, at 306. For example, the operation may be aborted and restarted.

Figure 4:
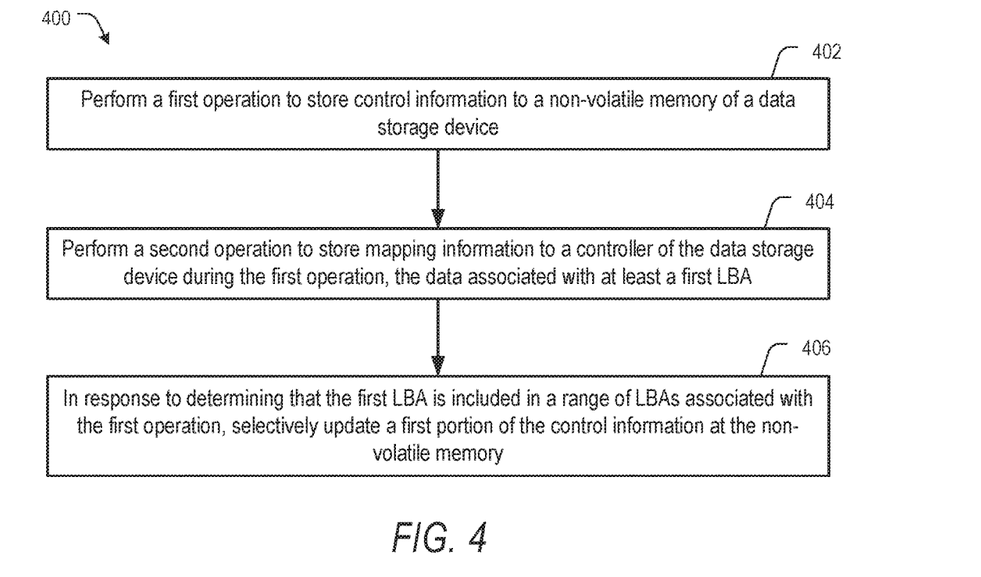
FIG. 4 is a flow chart of another particular illustrative example of a method of operation of the data storage device of FIG. 1.

Referring to FIG. 4, another illustrative example of a method of operation of a data storage device is depicted and generally designated 400. For example, the method 400 may be performed by the data storage device 102 of FIG. 1. The method 400 may be performed in accordance with aspects of the control data update process 200 of FIG. 2.

The method 400 includes performing a first operation to store control information to a non-volatile memory of the data storage device, at 402. For example, the first operation may correspond to an NBCS operation performed to synchronize a first version of the control information 184 stored at the memory 182 with a second version of the control information 184 stored at the non-volatile memory 104.

The method 400 further includes performing a second operation to store mapping information to a controller of the data storage device during the first operation, at 404. The data is associated with at least a first LBA. To illustrate, the second operation may include storing the data 174 to the non-volatile memory 104, and the data 174 may be associated with at least the first LBA 176. The control information 184 may be stored at the volatile memory 144 of the controller 130, as an illustrative example.

The method 400 further includes selectively updating a first portion of the control information at the non-volatile memory in response to determining that the first LBA is included in a range of LBAs associated with the first operation, at 406. For example, the first portion 188 may be updated in response to determining that the first LBA 176 is within the range of LBAs 186.

In conjunction with the described embodiments, an apparatus includes means (e.g., the device interface 172) for sending data (e.g., the control information 184) to a memory (e.g., the memory 182) of a host device (e.g., the device 180). The apparatus further includes means (e.g., the parity circuit 148) for determining first parity information (e.g., the first parity information 146) based on the data and for determining, in response to initiating an operation associated with the data, second parity information (e.g., the second parity information 150) associated with the data. The apparatus further includes means (e.g., the comparator 136) for comparing the first parity information to the second parity information to enable termination of the operation in response to the first parity information differing from the second parity information. The apparatus may further include means (e.g., the volatile memory 144) for storing the first parity information.

Although various components depicted herein are illustrated as block components and described in general terms, such components may include one or more microprocessors, state machines, or other circuits configured to enable such components to perform one or more operations described herein. For example, certain aspects of the comparator 136 may represent physical components, such as hardware controllers, state machines, logic circuits, or other structures, to enable the comparator 136 to compare the first parity information 146 and the second parity information 150.

Alternatively or in addition, certain aspects of the data storage device 102 may be implemented using a microprocessor or microcontroller. In a particular embodiment, one or more aspects of the comparator 136 may be implemented using a processor executing instructions (e.g., firmware) that are stored at the non-volatile memory 104. Alternatively, or in addition, executable instructions that are executed by the processor may be stored at a separate memory location that is not part of the non-volatile memory 104, such as at a read-only memory (ROM) that may be included in the controller 130.

The data storage device 102 may be coupled to, attached to, or embedded within one or more accessing devices, such as within a housing of the device 180. For example, the data storage device 102 may be embedded within the device 180 in accordance with a Joint Electron Devices Engineering Council (JEDEC) Solid State Technology Association Universal Flash Storage (UFS) configuration. To further illustrate, the data storage device 102 may be integrated within an electronic device (e.g., the device 180), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from the device 180 (i.e., "removably" coupled to the device 180). As an example, the data storage device 102 may be removably coupled to the device 180 in accordance with a removable universal serial bus (USB) configuration.

The device 180 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The device 180 may communicate via a controller, which may enable the device 180 to communicate with the data storage device 102. The device 180 may operate in compliance with a JEDEC Solid State Technology Association industry specification, such as an embedded MultiMedia Card (eMMC) specification or a Universal Flash Storage (UFS) Host Controller Interface specification. The device 180 may operate in compliance with one or more other specifications, such as a Secure Digital (SD) Host Controller specification as an illustrative example. Alternatively, the device 180 may communicate with the data storage device 102 in accordance with another communication protocol. In some implementations, the data storage device 102 may be integrated within a network-accessible data storage system, such as an enterprise data system, an NAS system, or a cloud data storage system, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. The data storage device 102 may be integrated within the device 180. In some implementations, the data storage device 102 may be coupled to the device 180 via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to the device 180 as embedded memory, such as in connection with an embedded Multi-Media Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The non-volatile memory 104 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The non-volatile memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where they direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
   a non-volatile memory; and
   a controller coupled to the non-volatile memory, the controller including:
   an interface configured to send control information to a host device, the control information associated with first parity information; and
   a circuit configured to determine second parity information associated with the control information,
   wherein the controller is configured to terminate an operation associated with the control information in response to the first parity information differing from the second parity information, and
   wherein the controller further includes a dual layer flash translation layer (FTL) having a first control information layer and a second control information layer, and wherein a first operation to store the control information to the non-volatile memory and a second operation to store mapping information to the controller during the first operation are non-blocking operations enabled by the first control information layer and the second control information layer.

2. The apparatus of claim 1, further comprising a comparator configured to compare the first parity information and the second parity information.

3. The apparatus of claim 1, wherein the first parity information and the second parity information include exclusive-or (XOR) values.

4. The apparatus of claim 1, further comprising a volatile memory configured to store the first parity information, wherein the interface is further configured to send the control information to a memory of the host device.

5. The apparatus of claim 4, wherein the controller is further configured to operate the memory of the host device as a virtual extension of the volatile memory.

6. The apparatus of claim 1, wherein the first control information layer and the second control information layer are split into regions, and wherein the first operation to store the control information to the non-volatile memory is associated with regions from both the first control information layer and the second control information layer.

7. The apparatus of claim 6, wherein the controller is further configured to selectively update the first control information layer or the second control information layer in regions that are not included in the first operation to store the control information to the non-volatile memory.

8. The apparatus of claim 1, wherein the terminated operation associated with the control information corresponds to the first operation to store the control information to the non-volatile memory in a non-blocking manner.

9. The apparatus of claim 1, wherein the controller is further configured to perform a rollback operation in response to termination of the first operation to store the control information to the non-volatile memory.

10. A method of operation of a data storage device, the method comprising:
  sending data from a controller of a data storage device to a memory of a host device;
  determining first parity information associated with the data before the data is sent to the memory of the host device;
  after the data is sent to the memory of the host device and in response to initiating an operation associated with the data, determining second parity information associated with the data; and
  in response to the first parity information differing from the second parity information, terminating the operation,
  wherein the data includes control information, and wherein the operation includes a non-blocking control sync operation to store the control information to a non-volatile memory while allowing updating of the control information during the storing of the control information.

11. The method of claim 10, wherein terminating the operation includes restarting the operation, rolling back the operation, declining to commit the operation, or invaliding data stored to a non-volatile memory of the data storage device in connection with the operation, and wherein the operation includes a relocation operation to copy the data from the memory of the host device to a non-volatile memory of the data storage device.

12. The method of claim 10, wherein the first parity information includes a first exclusive-or (XOR) value based on the data and determined by the controller at a first time, and wherein the second parity information includes a second XOR value based on the data and determined by the controller at a second time after the first time.

13. The method of claim 12, wherein the first XOR value differs from the second XOR value due to modification of the data by the host device between the first time and the second time.

14. An apparatus comprising:
  means for sending data to a memory of a host device;
  means for determining first parity information based on the data before the data is sent to the memory of the host device, and for determining, after the data is sent to the memory of the host device and in response to initiating an operation associated with the data, second parity information associated with the data; and
  means for comparing the first parity information to the second parity information to enable termination of the operation in response to the first parity information differing from the second parity information,
  wherein the data includes control information, and wherein the operation includes a non-blocking control sync operation to store the control information to a non-volatile memory while allowing updating of the control information during the storing of the control information.

15. The apparatus of claim 14, further comprising means for storing the first parity information.

16. A method of operation of a data storage device, the method comprising:
  performing a first operation to store control information to a non-volatile memory of a data storage device;
  performing a second operation to store data to a controller of the data storage device during the first operation, the data associated with at least a first logical block address (LBA); and
  in response to determining that the first LBA is included in a range of LBAs associated with the first operation, selectively updating a first portion of the control information at the non-volatile memory,
  wherein the first portion of the control information is updated independently of a second portion of the control information, wherein the first portion is associated with a first layer specified by a flash translation layer (FTL) of the data storage device, and wherein the second portion is associated with a second layer specified by the FTL.

17. The method of claim 16, wherein the first operation includes a non-blocking control sync (NBCS) operation to copy the control information from a memory of a host device to the non-volatile memory.

18. The method of claim 16, wherein the second operation is initiated in response to a request for write access to the non-volatile memory or in response to initiation of a maintenance operation at the data storage device.

* * * * *